United States Patent
Krzic et al.

(10) Patent No.: US 10,766,406 B2
(45) Date of Patent: Sep. 8, 2020

(54) REGULATION OF SEQUENTIALLY OPERATING LIGHT SOURCE AND DEVICE FOR CARRYING OUT THE METHOD

(71) Applicant: HELLA SATURNUS SLOVENIJA PROIZVODNJA SVETLOBNE OPREME ZA MOTORNA IN DRUGA VOZILA, D.O.O., Ljubljana (SI)

(72) Inventors: Peter Krzic, Preserje (SI); Martin Perkon, Ljubljana (SI); Jure Razpotnik, Ljubljana (SI)

(73) Assignee: HELLA SATURNUS SLOVENIJA PROIZVODNJA SVETLOBNE OPREME ZA MOTORNA IN DRUGA VOZILA, D.O.O., Ljubljiana (SI)

( * ) Notice: Subject to any disclaimer, the term of this patent is extended or adjusted under 35 U.S.C. 154(b) by 0 days.

(21) Appl. No.: 16/323,614

(22) PCT Filed: Aug. 7, 2017

(86) PCT No.: PCT/IB2017/054810
§ 371 (c)(1),
(2) Date: Feb. 6, 2019

(87) PCT Pub. No.: WO2018/029587
PCT Pub. Date: Feb. 15, 2018

(65) Prior Publication Data
US 2019/0168661 A1 Jun. 6, 2019

(30) Foreign Application Priority Data
Aug. 8, 2016 (SI) ................... P-201600187

(51) Int. Cl.
*B60Q 1/38* (2006.01)
*F21S 43/15* (2018.01)
(Continued)

(52) U.S. Cl.
CPC .............. *B60Q 1/38* (2013.01); *B60Q 11/007* (2013.01); *F21S 43/14* (2018.01); *F21S 43/15* (2018.01); *H05B 45/10* (2020.01); *H05B 45/50* (2020.01)

(58) Field of Classification Search
CPC .... B60Q 1/38; B60Q 11/007; H05B 33/0845; H05B 33/0884; H05B 33/0857; F21S 43/15; F21S 43/14
See application file for complete search history.

(56) References Cited

U.S. PATENT DOCUMENTS 3,656,103 A * 4/1972 Tanaka ..................... B60Q 1/38
340/478
2002/0036908 A1* 3/2002 Pederson ............. B60Q 1/2611
362/545
(Continued)

FOREIGN PATENT DOCUMENTS

FR 2057350 A5 5/1971
WO 2011148259 A2 12/2011

*Primary Examiner* — Tracie Y Green
(74) *Attorney, Agent, or Firm* — Saliwanchik, Lloyd & Eisenschenk

(57) ABSTRACT

The present invention refers to a method and a device for sequentially operating light source, in particular a lighting system for signalizing a change of driving direction of a motor vehicle, comprising a plurality of light emitting diodes (LED) connected in series, said diodes can be activated in a pre-determined sequence within a required time frame $t_0$. The method comprises activating within a required time frame ($t_0$) a sequential operation of a plurality of LEDs, wherein the operation of the first LED in the plurality of LEDs and operation of the last LED in the plurality of LEDs (Continued)

is carried out within an actual time frame ($t_1$) of operation. The method further comprises activating after lapse of a safety time frame ($t_2$) of all LEDs ($\mathbf{1}_1, \mathbf{1}_2 \ldots \mathbf{1}_n$) simultaneously.

6 Claims, 1 Drawing Sheet

(51) Int. Cl.
*F21S 43/14* (2018.01)
*B60Q 11/00* (2006.01)
*H05B 45/10* (2020.01)
*H05B 45/50* (2020.01)

(56) References Cited

U.S. PATENT DOCUMENTS

| | | |
|---|---|---|
| 2004/0114384 A1 | 6/2004 | Carter et al. |
| 2010/0128479 A1 | 5/2010 | Biebl et al. |
| 2011/0133655 A1* | 6/2011 | Recker .............. H02J 9/02 315/159 |
| 2013/0127340 A1 | 5/2013 | Huhn et al. |
| 2013/0127612 A1* | 5/2013 | Stadler .............. B60Q 1/34 340/465 |

* cited by examiner

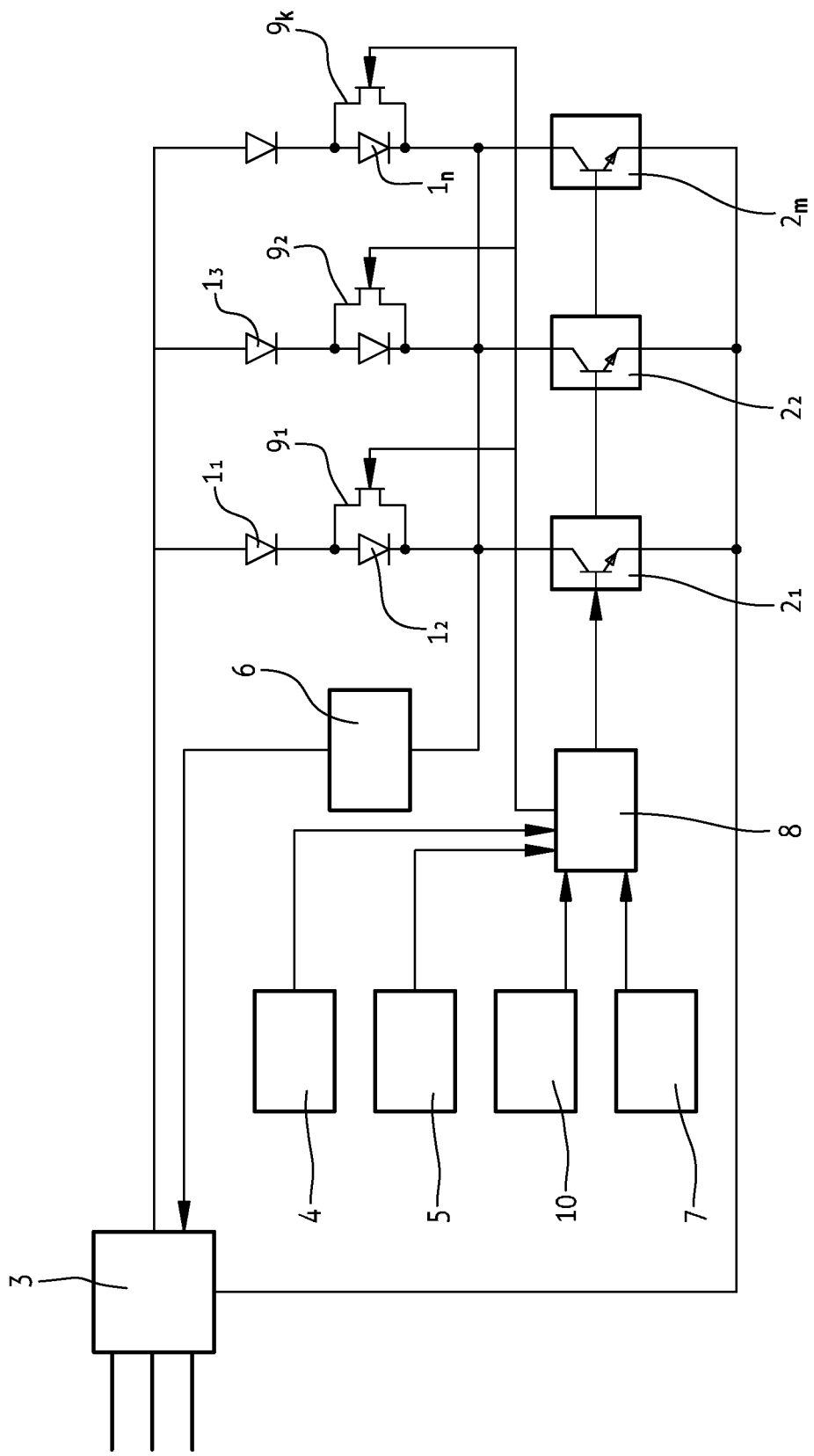

REGULATION OF SEQUENTIALLY OPERATING LIGHT SOURCE AND DEVICE FOR CARRYING OUT THE METHOD

CROSS REFERENCE TO RELATED APPLICATIONS

This application is a National Stage Application of International Application Number PCT/IB2017/054810, filed Aug. 7, 2017; which claims priority to Slovenia Application No. P-201600187, filed Aug. 8, 2016.

The present invention refers to a method and a device for sequentially operating light source, in particular a lighting system for signalizing a change of driving direction of a motor vehicle, comprising a plurality of light emitting diodes connected in series, said diodes can be activated in a pre-determined sequence.

Light systems for signalizing driving direction of a motor vehicle, comprising a plurality of light emitting diodes (LED) connected in series, said diodes can be activated in a pre-determined sequence are well known from various patent applications such as DE 10 2015 010 315 A1, CN 104816668 A, US 2015/0158416 A1, US 2013/0127612 A1, US 2009/0051523 A1, JP 2005132256 A, for example. None of said documents, however, disclose how to operate a sequentially operating light in order to enable a reliable functional safety of the lighting system operation. In case of a sequential circuit failure only the first LED from the plurality of LEDs would be operational in the worst scenario, however, the failure would not be detected by a vehicle diagnostic which is absolutely unacceptable from the functional safety point of view. In order to remedy said problems, most of the known solutions focus either to duplicating the control circuit or to duplicating the light sources or to the combination thereof.

It is the object of the present invention to create a method of sequentially operating light source, particularly with a motor vehicle, which enables a reliable functional safety of a lighting system operation. The invention further refers to a device for carrying out said method.

The object as set above is solved, according to the present invention, by features according to the characterising clause of the claim 1. The invention is disclosed in detail in corresponding subclaims.

The invention is further described in detail by way of non-limiting embodiment, and with a reference to the accompanying drawing, which shows a schematic view of a device for enabling a functional safety according to the invention.

A detailed description of the invention is based on the embodiment representing a device for sequentially operating lighting system for signalizing a change of driving direction of a motor vehicle and, respectively, a so called direction indicator. Said direction indicator comprises a plurality of light emitting diodes $1_1, 1_2 \ldots 1_n$ (LED) connected in series, that are controlled by means of a feeding device, such as a DC/DC converter or a plurality of constant current sources $2_1, 2_2 \ldots 2_m$, as provided for in the present embodiment, and similar. The number n of LEDs is preferably, yet non-limiting, selected as an even number. When the number n of LEDs is selected as the even number, a single current source $2_1, 2_2 \ldots 2_m$ is assigned per each pair $1_1, 1_2; 1_3, 1_4 \ldots 1_{n-1}, 1_n$ of the LEDs, whereby the direction indicator is attached by means of a connecting element in a manner know per se to the wiring of the headlamps. In the present embodiment, the number m of the current sources $2_1, 2_2 \ldots 2_m$ preferably equals to n/2. Energy is fed to said direction indicator via an input protecting element 3, which protects direction indicator against possible polarity reversal, electrostatic impulse, voltage pulse, and similar.

Moreover, said circuit is provided with a thermal protection element 4, the resistance thereof varies in dependence of temperature. When the temperature on said circuit reaches a critical value, said thermal protection element 4 lowers the current fed. The luminosity decreases consequently, thus, keeping the electronic components in permitted temperature ranges.

Said circuit is further provided with an excess voltage protection element 5, which in case of excessive voltage, in the present embodiment the voltage>19V, switches off the entire circuit of the direction indicator. In addition, a security element 6 is provided on said circuit which, in case that at least one LED $1_1, 1_2 \ldots 1_n$ in from the plurality of LEDs fails, provides for that the diagnostic system in the vehicle alerts a driver about the failure.

In addition to said elements, said circuit of the direction indicator also comprises a timer and shift element 7, which takes care of the sequential lighting of LEDs $1_1, 1_2 \ldots 1_n$ and a control element 8, which connects all aforesaid elements and takes care of the respective functions thereof are carried out. A switch $9_1, 9_2 \ldots 9_k$ is allocated to each second LED $1_2, 1_4 \ldots 1_1$ from the plurality of LEDs $1_1, 1_2 \ldots 1_n$. The number k of switches $9_1, 9_2 \ldots 9_k$ preferably equals to the number m of the current sources $2_1, 2_2 \ldots 2_m$, which preferably equals to n/2. At the beginning of the operation, when the energy is fed to the direction indicator all switches $9_1, 9_2 \ldots 9_k$ are closed, wherein only the first current source $2_1$ is turned on activating thus the operation of the first LED $1_1$ from the plurality of LEDs $1_1, 1_2 \ldots 1_n$. In the next sequence, the timer and shift element 7 opens the first switch $9_1$, whereby the second LED $1_2$ is activated. Afterwards, the second current source $2_2$ is turned on and the process repeats with the next pair of LEDs $1_3, 1_4$ from the plurality of LEDs $1_1, 1_2 \ldots 1_n$.

It is provided for according to the present invention, that a reserve security element 10 is attached to the control element 8, which takes care of operating the direction indicator when an error occurs and, respectively, at the failure any of the components of the direction indicator. Sequentially operating lighting system for signalizing change of driving direction operates in a required time frame $t_0$, which typically amounts to less or equal to 200 ms. In said time frame $t_0$ a required number of LEDs must be sequentially activated, preferably all LEDs $1_1, 1_2 \ldots 1_n$, from the first LED to the last one. After a lapse of a safety time frame $t_2$, which is smaller or at most equal to said required time frame $t_0$, but larger from or at least equal to an actual time frame $t_1$ of lighting all LEDs $1_1, 1_2 \ldots 1_n$ from the plurality of LEDs, the reserve security element 10 provides for reactivating all LEDs $1_1, 1_2 \ldots 1_n$ from the plurality of LEDs, but this time all simultaneously. Thus, the direction indicator according to the present invention operates in a manner, that the LEDs $1_1, 1_2 \ldots 1_n$ at first light sequentially, and within the safety time frame $t_2$ also all simultaneously.

Said actual time frame $t_1$ of lighting all LEDs $1_1, 1_2 \ldots 1_n$ from the plurality of LEDs can be at most equal or smaller with respect to said required time frame $t_0$ and is typically selected in the range between 130 ms and 150 ms. When simultaneously all LEDs $1_1, 1_2 \ldots 1_n$ from the plurality of LEDs are activated, said safety time frame $t_2$ is smaller or at most equal to said required time frame $t_0$, and simultaneously larger than or at least equal to said actual time frame $t_1$ of the lighting all LEDs $1_1, 1_2 \ldots 1_n$ from the plurality of LEDs, wherein the safety time frame $t_2$ is typically selected in the range between 150 ms and 190 ms.

When the direction indicator and, respectively, the device for providing functional safety according to the invention operates flawless, than the process of activating LEDs is carried out in the required sequential manner. If, however, any error occur on the circuit of the direction indicator and, respectively, any component of the direction indicator fails to operate, the process of activating LEDs is carried out in a manner, that at first LED $1_1$ is activated, and after a lapse of the safety time frame $t_2$ all other LEDs are activated simultaneously. In the following, the invention is represented on the basis of two examples.

EXAMPLE 1

Failure of the Timer and Shift Element

When the direction indicator is turned on the first LED $1_1$ in the plurality of LEDs is always activated, whereas remaining LEDs $1_2$, $1_3$ . . . $1_n$ are not activated due to said non-operation of the timer and shift element 7. In this particular case, said reserve security element 10 provides for by means of overriding all other circuits and, components, that all LEDs are activated simultaneously within the safety time frame $t_2 \leq t_0$ oz. $t_2 \geq t_1$.

EXAMPLE 2

Failure of One of the LEDs

If anyone of LED $1_1$, $1_2$ . . . $1_n$ from the plurality of LEDs fails, such as LED $1_3$ for instance, the security element 6 stores the information about a limited failure of the LED $1_3$ and all LED are not activated until the end of the sequence. The LEDs remain non-activated for the entire time frame within which the direction indicator is supposed to operate. The diagnostic takes place since the LEDs are not active and, thus, there is no power consumption and, respectively, the power consumption decreases.

The invention claimed is:

1. A method for sequentially operating a lighting system for signaling a change of driving direction of a motor vehicle, the lighting system comprising a plurality of light emitting diodes (LEDs) connected in series, said LEDs being configured to be activated in a pre-determined sequence within a required time frame, the method comprising the following steps:
   a) when a timer and shift element of the motor vehicle and all LEDs of the plurality of LEDs are operational, activating within the required time frame a sequential operation of the plurality of LEDs, wherein the operation of a first LED in the plurality of LEDs and operation of a last LED in the plurality of LEDs is carried out within an actual time frame of operation;
   b) when the timer and shift element fail after the first LED is activated, and after lapse of a safety time frame, simultaneously activating all remaining LEDs of the plurality of LEDs by means of a reserve security element; and
   c) when at least one LED of the plurality of LEDs fails, alerting a driver of the motor vehicle about said failure using a diagnostic system in the motor vehicle,
   wherein said safety time frame is equal to or smaller than the required time frame, but larger than the actual time frame of the activation of all LEDs of the plurality of LEDs.

2. The method according to claim 1, wherein the required time frame and the safety time frame are equal.

3. A device for sequentially operating a lighting system for signaling a change of driving direction of a motor vehicle, the device comprising:
   a) a control element;
   b) a plurality of light emitting diodes (LEDs) connected to each other in series and connected to the control element;
   c) a feeding device connected to the control element and configured to control at least one LED of the plurality of LEDs;
   d) a thermal protection element connected to the control element, the resistance of the thermal protection element being dependent on temperature;
   e) an excess voltage protection element connected to the control element;
   f) a security element connected to the control element, wherein the security element is configured for when at least one LED of the plurality of LEDs fails the security element alerts a driver of the motor vehicle about said failure;
   g) a timer and shift element connected to the control element, wherein the timer and shift element is configured to sequentially active LEDs of the plurality of LEDs; and
   h) a reserve security element connected to the control element, wherein the reserve security element is configured to take over operation of any of components d)-g) when the component fails, wherein the control element is configured to control elements b)-h) such that elements b)-h) carry out their respective functions, and wherein the control element is configured for when the timer and shift element fails after a first LED of the plurality of LEDs is activated, and after lapse of a safety time frame, all remaining LEDs of the plurality of LEDs are activated by means of the reserve security element.

4. The device according to claim 3, wherein a quantity of LEDs in the plurality of LEDs is an even number.

5. The method according to claim 1, wherein when at least one LED of the plurality of LEDs fails, all LEDs of the plurality of LEDs are non-activated.

6. The device according to claim 3, wherein the security element is further configured for when at least one LED of the plurality of LEDs fails, all LEDs of the plurality of LEDs are non-activated.

* * * * *